Patented Mar. 20, 1951

2,545,677

UNITED STATES PATENT OFFICE 2,545,677

MICROCRYSTALLINE WAX AS AN ANTIFOAM AGENT IN SOLUBLE OIL-WATER EMULSION

Elmer H. Sperry, Drexel Hill, Pa., assignor to Sun Oil Company, Philadelphia, Pa., a corporation of New Jersey No Drawing. Application May 29, 1947, Serial No. 751,458

5 Claims. (Cl. 252—49.5)

This invention relates to a novel cutting or metal working oil emulsion having improved resistance to foaming and rapid defoaming characteristics.

In the metal working art soluble oil emulsion compositions are employed. In use during metal working these compositions are found usually to foam to an extent such that the foam interferes with the work. For example, the foam accumulates on the metal being worked and makes observation of it difficult. Also, the foam causes overflow of reservoirs in which are kept bulk quantities of the composition. Other readily visualized disadvantages are also encountered.

According to this invention soluble oil emulsion compositions having foaming properties under use conditions are modified to produce compositions which have greatly improved resistance to foaming and rapid, if not almost immediate, defoaming characteristics.

Thus, according to this invention, to a soluble oil composition, having foaming properties under use conditions, is added a hydrocarbon wax having a high melting point (over 145° F.), such as microcrystalline wax, under conditions and in a manner described fully hereinafter.

Microcrystalline wax is now obtained in the oil refinery. The general nature and characteristics of microcrystalline wax are referred to in "Petroleum Refiner," vol. 25, No. 5, page 201, 202, "Industrial Use of Petroleum Waxes," J. C. Dean. As the name implies, the individual crystals of microcrystalline wax are much smaller than those of paraffin wax. In general, microcrystalline waxes are tough rather than brittle; some of them are flexible even at low temperatures and many of them possess a noticeable degree of tack. The viscosity of these waxes in molten condition is substantially and materially greater than paraffin wax. Though microcrystalline wax is paraffinic in its chemical nature, the compounds of which it consists are not the same as those which constitute paraffin wax. The compounds which constitute microcrystalline wax have a materially higher molecular weight and lower proportion of normal or straight chain hydrocarbons than do those found in paraffin waxes. Microcrystalline wax is derived from oils heavier than those from which paraffin waxes are made and usually are recovered from residual oils, that is, from oils taken off as distillation bottoms.

More specifically, the more important properties of microcrystalline wax may be summarized as follows:

Flash point (A. S. T. M. D92–33), over 400° F.
Melting point (A. S. T. M. D127–30), 145° F.–200° F.
Viscosity (A. S. T. M. D445–42T), 50–105 sec./210° F.
Penetration (A. S. T. M.), 1–150
Molecular weight, 500–850

It will be understood by those versed in the art that I may employ the microcrystalline wax in its crude state, that is, as recovered from the de-waxing operation. In this state an amount of oil is present in the wax body. When crude wax is employed, it may in some instances vary from refined microcrystalline wax in one or more of its properties. The properties most likely to be different are melting point and penetration. Melting point will be correspondingly lowered and penetration correspondingly raised. However, as long as microcrystalline wax is employed, whether refined or in the crude state, the objects of this invention can be accomplished.

Thus, according to this invention there may be employed either refined microcrystalline wax or this wax in one of its crude states. One of these crude waxes which has been employed with satisfactory results has the following properties:

Melting point, 165° F.
Viscosity, 91 sec./210° F.
Penetration, 170
Molecular weight, 680 (approx.)
Oil content (by recrystallization from 10 vols. of ethylene dichloride at 0° F.), 20–25%

The soluble oil compositions to which microcrystalline wax can be added to improve their resistance to foaming and to impart to them rapid defoaming characteristics are well known in the art.

In Patent No. 2,056,913, Terrell, Hughes, and Carter, issued October 6, 1936, there is described and claimed a method for the preparation of a soluble oil composition comprising a blend of lubricating oil and soaps of petroleum naphthenic acids. Briefly, the process comprises adding a mineral acid to asphaltic bottoms containing naphthenic acid soaps, produced in the distillation of naphthenic base oil in the presence of an alkali, to effect the acidification of such soaps, and adding also a sufficient quantity of lubricating oil of lower boiling point than the asphaltic bottoms to enable the hereinafter recited distillation to be effected without substantial cracking of the distillate, subjecting the resultant emulsion of asphalt, oil and naphthenic acids to distillation to vaporize the acids and oil, condensing the acid-oil vapors, and adding to the condensate an alkali adapted to convert the contained acids to soaps and form a mineral oil and soap emulsion. Another soluble oil composition is fully described in Patent No. 2,395,627 to Johnson and Perrine, issued February 26, 1946. The soluble oil product of that patent comprises a major proportion of lubricating oil and a minor proportion of alkali metal soaps of relatively weak synthetic acids possessing the characteristics of the acid fraction obtained by oxidizing a naphthenic base lubricating oil of about 270 S. U. viscosity at 100° F. in liquid phase by means of a free-oxygen containing gas at a temperature within the range of 120° C.–165° C. and a superatmospheric pressure below 175 pounds per square inch, discontinuing the oxidation when the reaction mixture has a saponification value of 110–120 milligrams KOH per gram, completely saponifying the reaction mixture with an alkali metal hydroxide, fractionally acidifying about 50 per cent of the soaps in the saponified mixture to obtain a relatively weak acid fraction and washing said fraction with water.

According to this invention a microcrystalline wax is stirred vigorously into the soluble oil composition which is preferably preheated to about the melting point of the wax.

The quantity of wax added will depend upon a number of factors. Thus, the exact quantity of wax fraction added will depend upon the nature of the soluble oil composition to which it is to be added and the degree if any to which the wax has been refined. It has been found that the practical upper limit for the quantity of wax which can be added is about that which can be caused to dissolve completely in the mineral oil emulsion composition. Usually a quantity in the range 0.01%–1.0% will cause a substantial improvement in the foam resisting tendency and defoaming characteristics of the emulsion. A slight overloading of the soluble oil composition, from the viewpoint of complete solubility is now preferred.

The following table shows a comparison of results obtained upon testing a soluble oil emulsion composition according to Patent No. 2,395,627, as described above, to which various types of waxes were added in the manner hereinabove set forth:

| Wax Used | Per Cent Added | Foam Increase,[1] in Volume Per Cent | Time in Minutes for Foam to Break |
|---|---|---|---|
| None added | | Over 500 | Over 15 |
| Montan | 0.5 | 300–400 | Over 2 |
| Paraffin | Up to 8 | Over 500 | Over 15 |
| Candelilla | 0.5 | 300 | Over 2 |
| Crude microcrystalline | 0.5 | 200 | Less than 1/10 |
| Microcrystalline | 0.5 | 200 | Do. |

[1] Cooperating Research Council L-12 test.

While only one example of a soluble oil composition has been given it will be understood that this invention is adapted to soluble oils generally.

While the compounding of the wax with the soluble oil composition is preferred it will be understood that insofar as it is practical the wax can be added to the soluble oil emulsion composition.

Variation and modification is possible within the scope of the invention covered in the appended claims the essence of which is that microcrystalline wax is added to soluble oils or emulsions to improve their resistance to foaming and to impart to them rapid defoaming characteristics.

I claim:

1. A composition of matter comprising a soluble oil having the known composition of a major proportion of a mineral oil and a minor proportion, effective to impart to the mineral oil miscibility with water, of a soap, said known compositions being characterized by miscibility with water to form an emulsion having foaming properties and microcrystalline wax having a melting point of from 145° F. to 200° F. and a molecular weight of from 500 to 850 in a quantity comprising a small fractional proportion of said soap and effective to inhibit excessive foaming and to cause rapid defoaming.

2. A composition of matter comprising a soluble oil having the known composition of a major proportion of a mineral lubricating oil and a minor proportion, effective to impart to the mineral lubricating oil miscibility with water, of soaps of petroleum naphthenic acids, said known compositions being characterized by miscibility with water to form an emulsion having foaming properties and microcrystalline wax having a melting point of from 145° F. to 200° F. and a molecular weight of from 500 to 850 in a quantity comprising a small fractional proportion of said soap and effective to inhibit excessive foaming and to cause rapid defoaming.

3. A composition of matter according to claim 2 wherein said microcrystalline wax is present in a quantity within the range 0.01%–1.0% of the oil.

4. A composition of matter comprising a soluble oil consisting essentially of a major proportion of mineral oil and a minor proportion, effective to impart to the mineral oil miscibility with water, of a soap, said soluble oil being characterized by miscibility with water to form an emulsion having foaming properties, and from 0.01% to 1.0% of a microcrystalline wax having a melting point of from 145° F. to 200° F. and a molecular weight of from 500 to 850 as the sole antifoaming agent.

5. A composition of matter comprising a soluble oil consisting essentially of a major proportion of mineral oil and a minor proportion, effective to impart to the mineral oil miscibility with water, of soaps of petroleum naphthenic acids, said soluble oil being characterized by miscibility with water to form an emulsion having foaming properties, and from 0.01% to 1.0% of a microcrystalline wax having a melting point of from 145° F. to 200° F. and a molecular weight range of from 500 to 850 as the sole anti-foaming agent.

ELMER H. SPERRY.

REFERENCES CITED

The following references are of record in the file of this patent:

UNITED STATES PATENTS

| Number | Name | Date |
|---|---|---|
| 2,298,844 | Schilling et al. | Oct. 13, 1942 |
| 2,340,035 | Zimmer et al. | Jan. 25, 1944 |